United States Patent [19]
Hunniger et al.

[11] Patent Number: 5,440,370
[45] Date of Patent: Aug. 8, 1995

[54] PHOTOGRAPHIC COPIER HAVING DIFFERENT MAGNIFICATIONS

[75] Inventors: Heinrich Hunniger, Rottelmisch; Walter Drechsler, Gera, both of Germany

[73] Assignee: AGFA-Gevaert Aktiengesellschaft, Leverkusen, Germany

[21] Appl. No.: 75,161

[22] Filed: Jun. 10, 1993

[30] Foreign Application Priority Data

Jul. 27, 1992 [DE] Germany ............ 42 24 740.3

[51] Int. Cl.⁶ ............................................ G03B 27/52
[52] U.S. Cl. ........................................ 355/55; 355/63; 355/237
[58] Field of Search .............. 355/55, 63, 237, 243

[56] References Cited

U.S. PATENT DOCUMENTS

| | | | |
|---|---|---|---|
| 3,169,441 | 2/1965 | Johnson | 355/63 X |
| 4,174,895 | 11/1979 | Fermaglich et al. | 354/76 |
| 4,212,531 | 7/1980 | Shimomura | 355/55 |
| 4,441,805 | 4/1984 | Smith | 355/55 X |
| 4,607,943 | 8/1986 | Yoshioka et al. | 355/55 X |
| 4,632,522 | 12/1986 | Ishitani | 355/55 X |
| 4,901,107 | 2/1990 | Iwamoto et al. | 355/55 |
| 5,099,275 | 3/1992 | Hicks | 355/55 |
| 5,119,135 | 6/1992 | Baldwin | 355/243 X |
| 5,264,948 | 11/1993 | Imoto | 355/55 X |

FOREIGN PATENT DOCUMENTS

| | | |
|---|---|---|
| 2614090 | 10/1977 | Germany . |
| 2849725 | 8/1979 | Germany . |
| 3720198 | 12/1987 | Germany . |

OTHER PUBLICATIONS

Castle Rock Manufacturing, Inc. Brochure on Package Printer.

*Primary Examiner*—Fred L. Braun
*Attorney, Agent, or Firm*—Darby & Darby

[57] ABSTRACT

A photographic copier has a copying station with a platen for a master to be reproduced and a platen for copy material. A straight guide extends across the copying station below the platen for the master and above the platen for the copy material, and a carrier is movable along the guide. The carrier supports several parallel rows of objectives, and the rows extend transverse to the direction of travel of the carrier. The objectives of each row have the same magnification and the magnification decreases successively from row to row, or vice versa. Each row is located at a different level of the carrier with the row of maximum magnification at the highest level and the row of minimum magnification at the lowest level. The objectives have vertical optical axes and the guide is inclined to the optical axes at an angle different from 90 degrees. The row of maximum magnification is disposed at the end of the carrier which faces the lower end of the guide. In order to obtain a particular magnification, the carrier is shifted until the optical axis of an objective having the desired magnification coincides with the optical axis of the copying station. The objective is then spaced from the master platen by a distance equal to the focal length of the objective.

9 Claims, 3 Drawing Sheets

PHOTOGRAPHIC COPIER HAVING DIFFERENT MAGNIFICATIONS

BACKGROUND OF THE INVENTION

The invention relates generally to a copier or printer, especially a photographic copier or printer.

More particularly, the invention relates to a photographic roll copier having a platen for a master, e.g., a negative, to be reproduced and a platen for the roll copy material. A projection device produces images of the master on the copy material at different magnifications. The projection device contains several projection units which can be selectively moved into the optical path between the platens, and each projection unit includes one or more objectives.

In the copying art, it is necessary to bring projection units of varying focal length into the path of the copy light in order to produce multiple images, i.e., so-called packages.

The German patent 26 14 090 describes a lens holder for a photographic copier. The projection units are mounted on separate platforms which are shiftable perpendicular to the optical axes of, and relative to, the objectives in order to position the latter. The platforms may be driven pneumatically, for example.

The German Offenlegungsschrift 28 49 725 discloses a device for the production of photographic documents and of images in various formats. The device consists of a carrier which holds a plurality of projection units having different focal lengths, and the carrier is movable perpendicular to the optical axes of the objectives and transverse to the platens for the masters and copy material. The projection units are positioned on the carrier in order of magnification. Accordingly, in order to permit production of the largest and smallest formats, the length of the carrier, as considered along a direction parallel to the optical axis, is at least equal to the maximum possible master platen-objective spacing minus the minimum possible spacing.

Also known are arrangements in which the projection units are mounted on a rotatable carrier. See, for instance, U.S. Pat. No. 3,169,441.

A brochure of Castle Rock Manufacturing, Inc. describes a package printer which can be either microprocessor-controlled or computer-controlled. Film sizes of 35 mm to 70 mm can be exposed by rapid, simultaneous exchange of rotary lens platens. This device makes it possible to produce single formats as well as packages with little waste of paper and, by virtue of an integrated cutter, with little work. Exposure takes place with white light or by means of an automatic, integrated, color exposure control unit.

In all prior art arrangements, the use of several magnifications necessarily results in bulkiness of the projection units and of the individual components which carry the objectives. The accompanying large masses have an adverse effect, particularly as regards positioning and objective exchange time. When pneumatic drives are employed, jerky loading of components, adjustment problems and noisy positioning can be expected.

SUMMARY OF THE INVENTION

It is an object of the invention to provide a lens changing device which can be constructed relatively compactly.

Another object of the invention is to provide a lens changing device which can be installed relatively easily.

An additional object of the invention is to provide a lens changing device which can position a lens with a relatively high degree of precision.

A further object of the invention is to provide a lens changing device capable of relatively quiet operation.

It is also an object of the invention to provide a lens changing device which enables a lens exchange to be accomplished relatively rapidly.

Still another object of the invention is to provide a lens changing device which can accommodate a relatively large number of lenses of different magnifications, can be relatively compact and can be assembled relatively inexpensively while allowing reasonably precise and quiet lens exchange within relatively short periods of time.

The preceding objects, as well as others which will become apparent as the description proceeds, are achieved by the invention.

The invention resides in a copier or printer, particularly a photographic copier or printer. The copier comprises a guide having a substantially straight segment, a carrier on the guide movable along the segment, and a plurality of lenses on the carrier having substantially parallel optical axes. The segment is inclined to the optical axes at an angle different from 90 degrees.

Different lenses may have different magnifications. If two or more lenses have the same magnification, these lenses may be arranged in a group. A lens of given magnification, or a group of lenses having the same magnification, will be referred to as a projection unit where convenient.

The copier has a copying station and different projection units may be arranged to be selectively positioned in the copying station. The copying station may be provided with a platen or support for a master, e.g., a negative, to be reproduced as well as a platen or support for copy material. The master platen can define a plane and the straight guide segment, which preferably extends across the copying station, may have a first end farther from the plane and a second end nearer the plane. The carrier has a first end portion nearer the first end of the straight guide segment and a second end portion nearer the second end of the segment, and the projection unit of maximum magnification is advantageously disposed at the first end portion of the carrier.

It is preferred for the projection units to be arranged on the carrier so that the magnification decreases as considered in the direction of the projection of the carrier in a plane normal to the optical axes. In other words, the projection units are preferably arranged so that, as the carrier is moved across the copying station, the projection unit of maximum magnification is the first to enter the path of the copy light and the projection unit of minimum magnification is the last to enter such path, or vice versa.

Arrangement of the straight guide segment at other than a right angle to the optical axes of the lenses makes it possible for the carrier to have a relatively small mass and relatively small dimensions while nevertheless allowing projection units of as many different magnifications as necessary to be mounted on the carrier. The functioning of a projection unit located in a defined area between the master platen and the copy material platen is not affected by light from neighboring projection units. The reduced dimensions make it possible to use drive systems which, with little noise and a high degree of precision, can cause the carrier to perform the translational movements necessary for projection unit exchange within short time spans.

The novel features which are considered as characteristic of the invention are set forth in particular in the appended claims. The improved copier itself, both as to its construction and its mode of operation, together with additional features and advantages thereof, will, however, be best understood upon perusal of the following detailed description of certain currently preferred embodiments when read in conjunction with the accompanying drawings.

DESCRIPTION OF THE PREFERRED EMBODIMENTS

Figure 1:
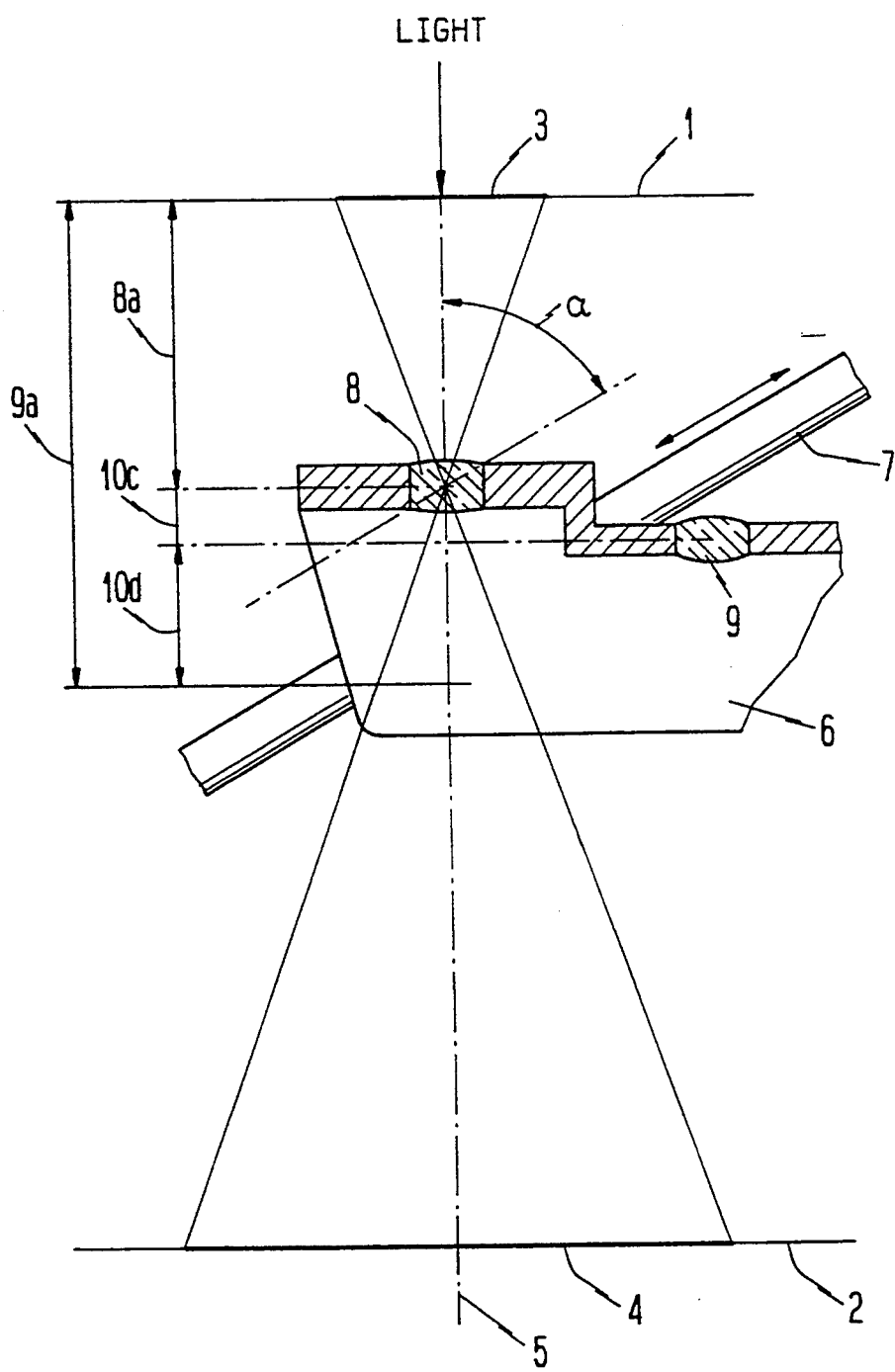
FIG. 1 is a fragmentary, partly sectional side view of a copying station in a photographic roll copier provided with a lens changing device according to the invention.

FIG. 1 illustrates a copying or printing station of a photographic roll copier or printer. The copying station is provided with a first platen or support 1 which defines a first horizontal support plane for a master 3, e.g., a negative, to be reproduced. The copying station is further provided with a second platen or support 2 which defines a second horizontal support plane for copy material 4 supplied from a roll of such material. The support plane for the master 3 may be referred to as an object plane while the support plane for the copy material 4 may be referred to as an image plane.

Figure 3:
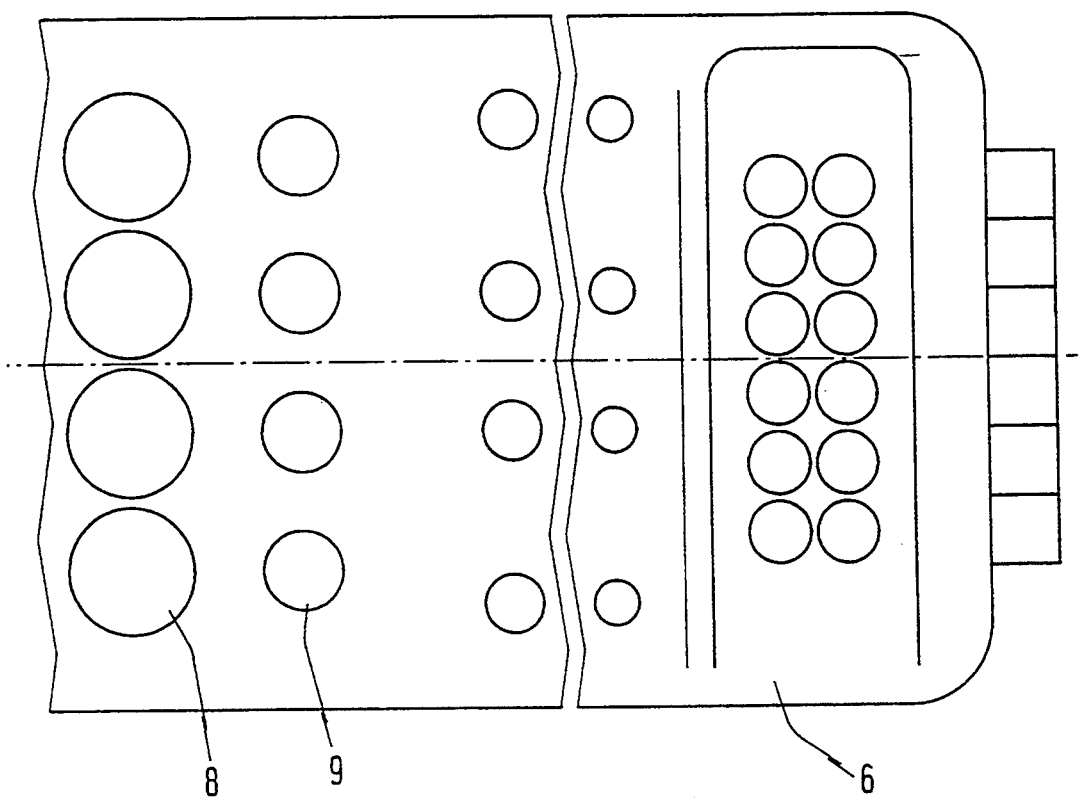
FIG. 3 is a fragmentary plan view of the lens changing device.

A lens changing device is located in the copying station and serves to form images of the master 3 on the copy material 4 at different magnifications. The lens changing device includes a plurality of projection units such as 8 and 9 having different magnifications and focal lengths. As shown in FIG. 3, each of the projection units 8,9 here includes a group of objectives which are arranged in a row. The rows extend normal to the plane of FIG. 1, and the objectives of each group or row have the same magnification and focal length. It is also possible for a projection unit 8,9 to have only a single objective. The optical axes of all the objectives are parallel to one another and extend vertically. The copying station has an optical axis 5 which likewise extends vertically and, in FIG. 1, coincides with the optical axis of one of the objectives of the projection unit 8.

The projection units 8,9 are mounted on a common carrier 6. The carrier 6 has a separate lens holder for each of the projection units 8,9. The lens holders for the projection units 8,9 are disposed at different levels of the carrier 6 so that the lens holders are separated by a predetermined distance 10c in the vertical direction, i.e., in a direction parallel to the optical axes of the objectives of the projection units 8,9 and perpendicular to the planes of the platens 1,2.

The carrier 6 is displaceable along a straight guide 7 which extends across the copying station. The guide 7 is inclined to the optical axes of the objectives of the projection units 8,9 at an angle alpha different from 90 degrees.

Referring again to FIG. 3, the guide 7 has a horizontal projection in the plane of this FIGURE, i.e., in a plane parallel to the planes of the platens 1,2 and normal to the optical axes of the objectives of the projection units 8,9. The rows of objectives making up the projection units 8,9 extend normal to the horizontal projection of the guide 7. These rows are separated from one another by a predetermined spacing as considered along such horizontal projection, that is, the optical axes of the objectives of the projection unit 8 are separated from the optical axes of the objectives of the projection unit 9 by a predetermined spacing as considered along the horizontal projection of the guide 7.

FIG. 3 shows that the carrier 6 may support projection units additional to the projection units 8,9. The projection units are here preferably arranged in order of magnification as considered along the horizontal projection of the guide 7. In FIG. 3, the magnification decreases successively from left to right. Thus, the projection unit 8 has the greatest magnification, the projection unit 9 has the second greatest magnification, the projection unit immediately to the right of the projection unit 9 has the third greatest magnification, and so on.

Due to the inclination of the guide 7, one end of the latter is located farther from the plane of the master platen 1 than the other. It is further preferred for the projection unit having the greatest magnification, i.e., the projection unit which has the smallest spacing from the master platen 1 when positioned in the copying station, to be located at the end of the carrier 6 which confronts or is nearest to that end of the guide 7 farthest from the master platen 1.

when the carrier 6 holds five or more projection units as in FIG. 3, the guide 7 is advantageously inclined to the optical axes of the objectives at an angle of approximately 70 degrees, i.e., is advantageously inclined to the horizontal at an angle of about 20 degrees.

FIG. 3 illustrates that there are many ways of arranging objectives of different magnification on the carrier 6. FIG. 3 also shows the large number of objectives which can be mounted on the carrier 6.

Referring back to FIG. 1, the position of an objective for focusing an image of the master 3 in the plane of the copy material platen 2 is characterized by the position of the principal plane of the objective along the optical axis 5 of the copying station when the objective is located in such station. In other words, the position of an objective for focusing an image of the master 3 in the plane of the copy material platen 2 is characterized by the focal length of the objective which is the distance between the master platen 1 and the principal plane of the objective when the objective is properly positioned in the copying station. The focal length of the objectives of the projection unit 8 is denoted by 8a whereas the focal length of the objectives of the projection unit 9 is denoted by 9a.

Since the guide 7 is inclined to the optical axes of the objectives at an angle alpha different from 90 degrees, the predetermined vertical distance 10c between the neighboring projection units 8 and 9 is smaller than the difference between the focal lengths 8a and 9a. This is so because the angle alpha compensates for part of the difference between the focal lengths 8a and 9a.

When the projection unit 8 in the copying station is to be replaced by the projection unit 9 so as to reduce the magnification of the master 3 on the copy material 4, the carrier 6 is shifted along the guide 7 to the left in FIG.

1. The distance moved by the carrier 6 along the guide 7 is precisely that which is required to bring the principal plane of an objective of the projection unit 9 into register with the optical axis 5 of the copying station. The horizontal component of movement of the carrier 6 equals the distance, as measured along the horizontal projection of the guide 7, between the optical axis of an objective of the projection unit 8 and the optical axis of an objective of the projection unit 9. The vertical component of movement of the carrier 6, that is, the component of movement of the carrier 6 perpendicular to the planes of the platens 1 and 2, is 10$d$.

The sum of the vertical component of movement of the carrier 6 and the predetermined vertical distance between the projection units 8 and 9 equals the difference between the focal lengths 8$a$ and 9$a$ of the projection units 8 and 9. It will be seen that the inclination of the guide 7 at an angle different from 90 degrees allows the dimensions of the carrier 6 both parallel and perpendicular to the optical axis 5 of the copying station to be smaller than the dimensions of the prior art carriers which move normal to the optical axis of the copying station.

The vertical distances between neighboring projection units to ensure optimum image formation are a minimum.

Figure 2:
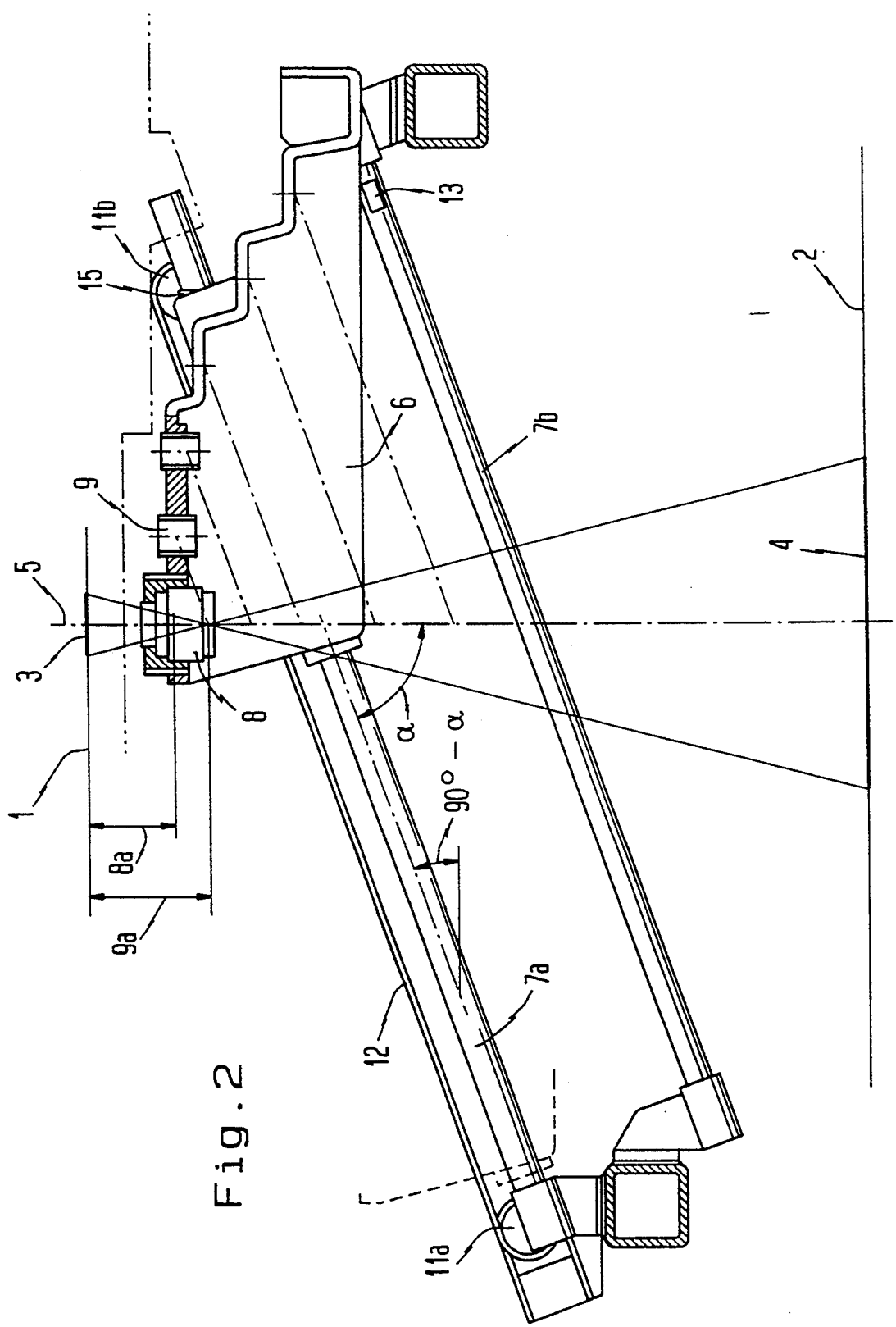
FIG. 2 is a partly sectional side view of the copying station of FIG. 1 showing additional structural details.

FIG. 2 illustrates a currently preferred design for achieving substantially frictionless and relatively noiseless translational displacement of the carrier 6 on the guide 7 so as to ensure precise objective exchange.

As shown in FIG. 2, the guide 7 includes an upper guide element or guide rail 7$a$ and a lower guide element or guide rail 7$b$. The upper guide rail 7$a$ is provided with ball bearings on which the carrier 6 rides with substantially no friction. An abutment 13 on the carrier 6 is guided by the lower guide rail 7$b$ and, in conjunction with the ball bearings on the upper guide rail 7$a$, results in substantially frictionless translational movement of the carrier 6 along the guide 7.

The carrier 6 is driven along the guide 7 by a toothed belt drive which comprises a step motor having a sprocket 11$a$. The drive further comprises a counter-roller 11$b$ and a toothed belt 12 which is connected to the carrier 6 at a suitable location. The step motor is regulated by a control unit. In order to activate the control unit, the carrier 6 is formed with a mark and the guide rail 7 is provided with a sensor for the mark.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A copier, comprising a guide having a substantially straight segment; a carrier on said guide movable along said segment; and a plurality of lenses on said carrier having substantially parallel optical axes, said segment being inclined to said axes at an angle different from 90 degrees; a copying station; and wherein said lenses have different magnifications and are arranged to be selectively positioned in said copying station;

said copying station having a support for a master to be reproduced, said support defining a plane; and wherein said segment extends through said station, said segment having a first end which is farther from said plane and a second end which is nearer said plane, and said carrier having a first end portion nearer said first end and a second end portion nearer said second end, said lenses having different magnifications and including at least one lens having a maximum magnification, and said one lens being disposed at said first end portion, said segment has a projection in a plane substantially normal to said axes, said lenses having different magnifications and being arranged so that the magnification decreases as considered in the direction of said projection, said lenses include a first lens having a first focal length and a second lens having a different second focal length, said segment being inclined so as to compensate for only a portion of the difference between said focal lengths.

2. The copier of claim 1, wherein said segment has a projection in a plane substantially normal to said axes, said lenses including a first lens having a first focal length and a second lens having a different second focal length, and said first and second lenses being spaced from one another as considered along said projection and being separated by a predetermined distance as considered parallel to said axes, said carrier undergoing a predetermined displacement as considered parallel to said axes upon movement of said carrier through a distance, as considered along said projection, equal to the spacing between the optical axes of said first and second lenses, said predetermined distance plus said predetermined displacement substantially equaling the difference between said first and second focal lengths.

3. The copier of claim 2, wherein said carrier has first an second holders which, as considered parallel to said axes, are separated by a distance substantially equal to said predetermined distance, said first lens being located in said first holder and said second lens being located in said second holder.

4. The copier of claim 1, further comprising a copying station; and wherein five lenses arranged to be selectively positioned in said copying station are mounted on said carrier, said segment being inclined to said axes at about 70 degrees.

5. The copier of claim 4, wherein said axes are substantially vertical.

6. The copier of claim 1, further comprising means for moving said carrier along said segment, said moving means including a step motor, and a driven element powered by said motor and connected to said carrier.

7. The copier of claim 6, wherein said element comprises an endless toothed belt.

8. The copier of claim 1, further comprising means for moving said carrier along said segment, and means for regulating said moving means, said regulating means including a marker on one of said guide and said carrier and a sensor for said marker on the other of said guide and said carrier.

9. The copier of claim 8, wherein said sensor is provided on said guide.

* * * * *